June 26, 1934.  S. KLEIN  1,964,437
VEGETABLE CUTTER AND GRATER
Filed Sept. 15, 1932  3 Sheets-Sheet 2
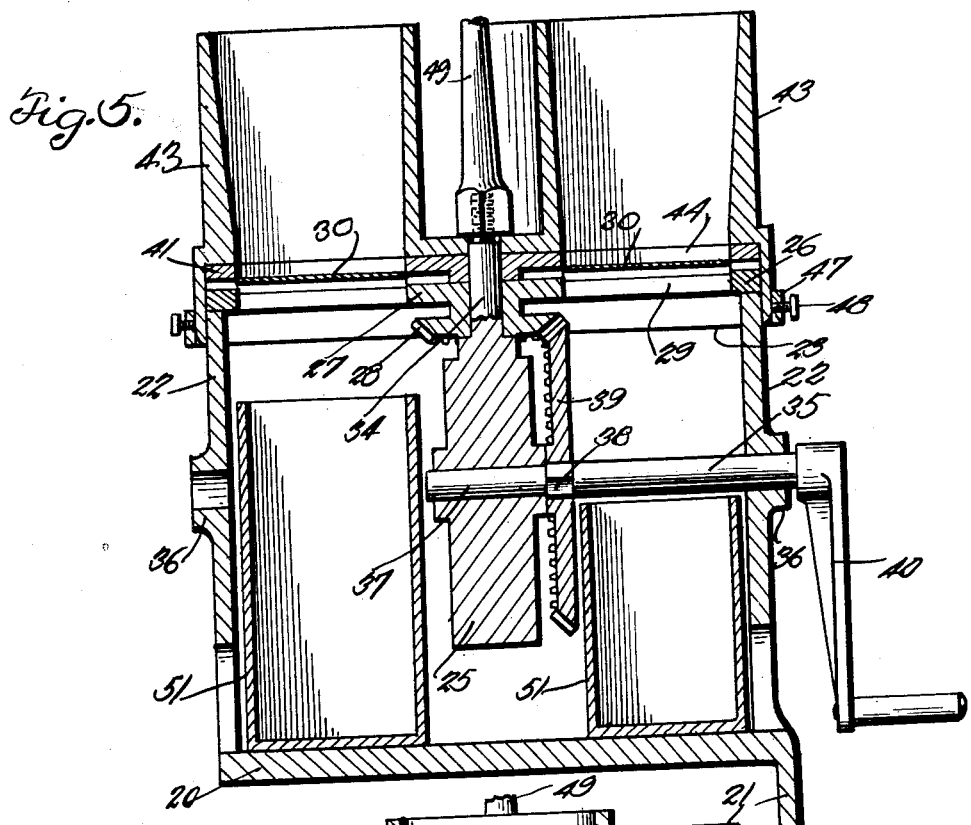
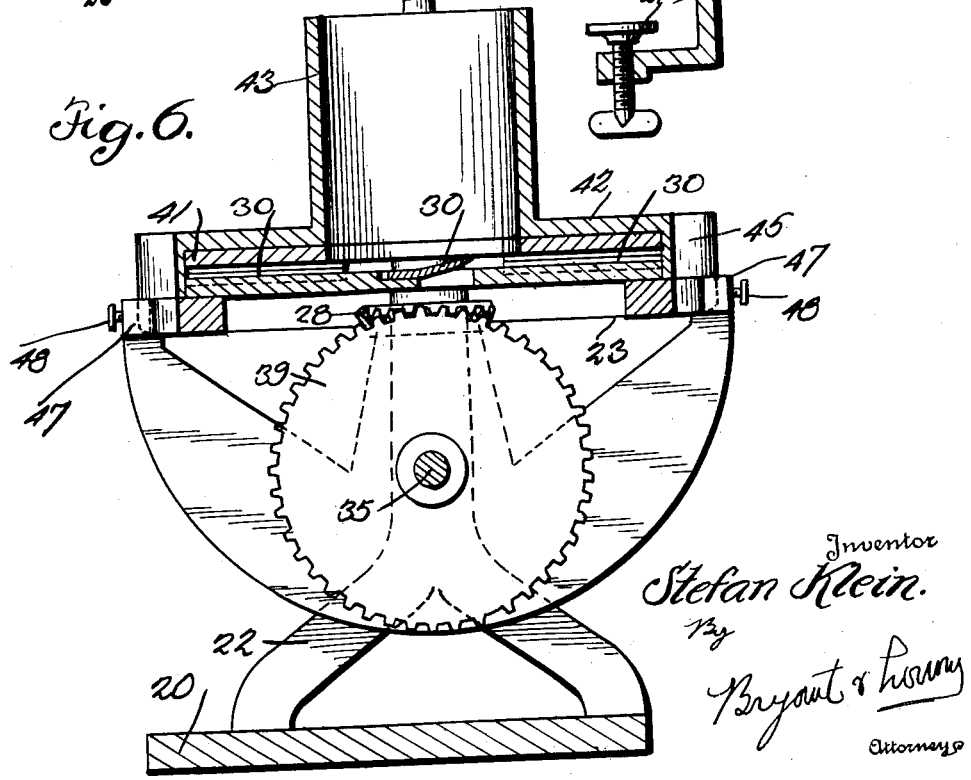
Inventor
Stefan Klein.
By
Bryant & Lowry
Attorneys June 26, 1934.　　　　S. KLEIN　　　　1,964,437
VEGETABLE CUTTER AND GRATER
Filed Sept. 15, 1932　　　3 Sheets-Sheet 3
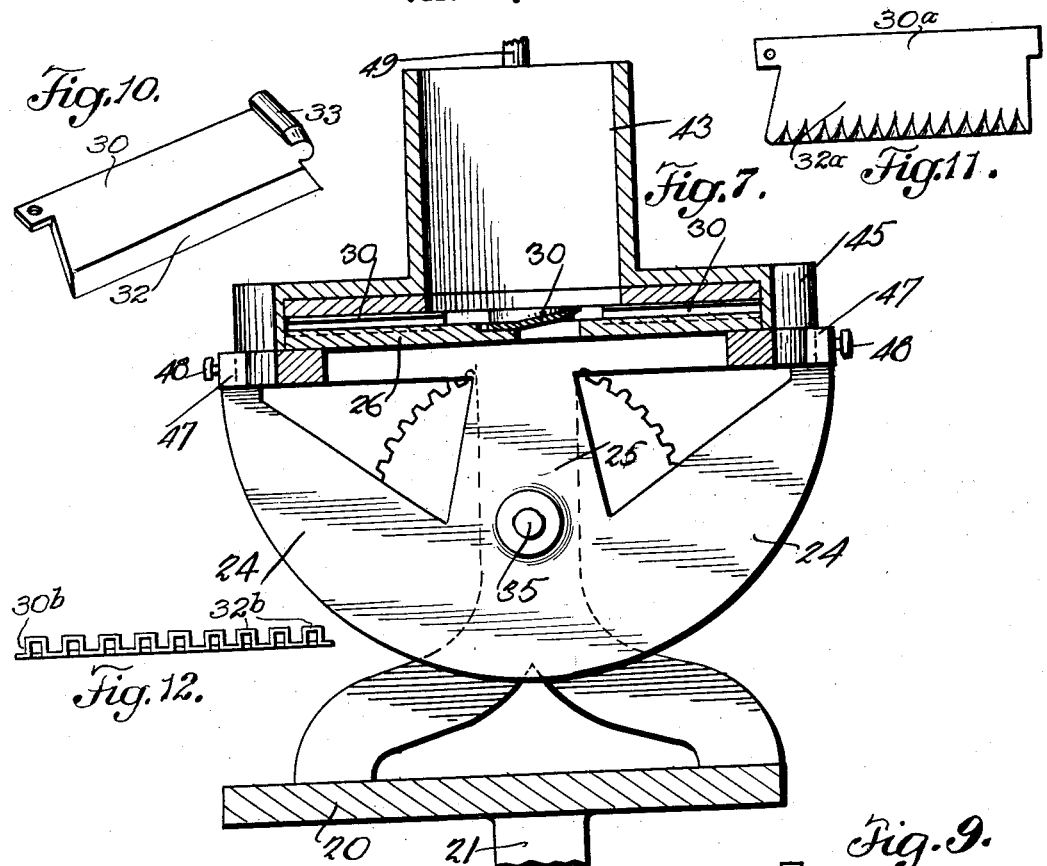
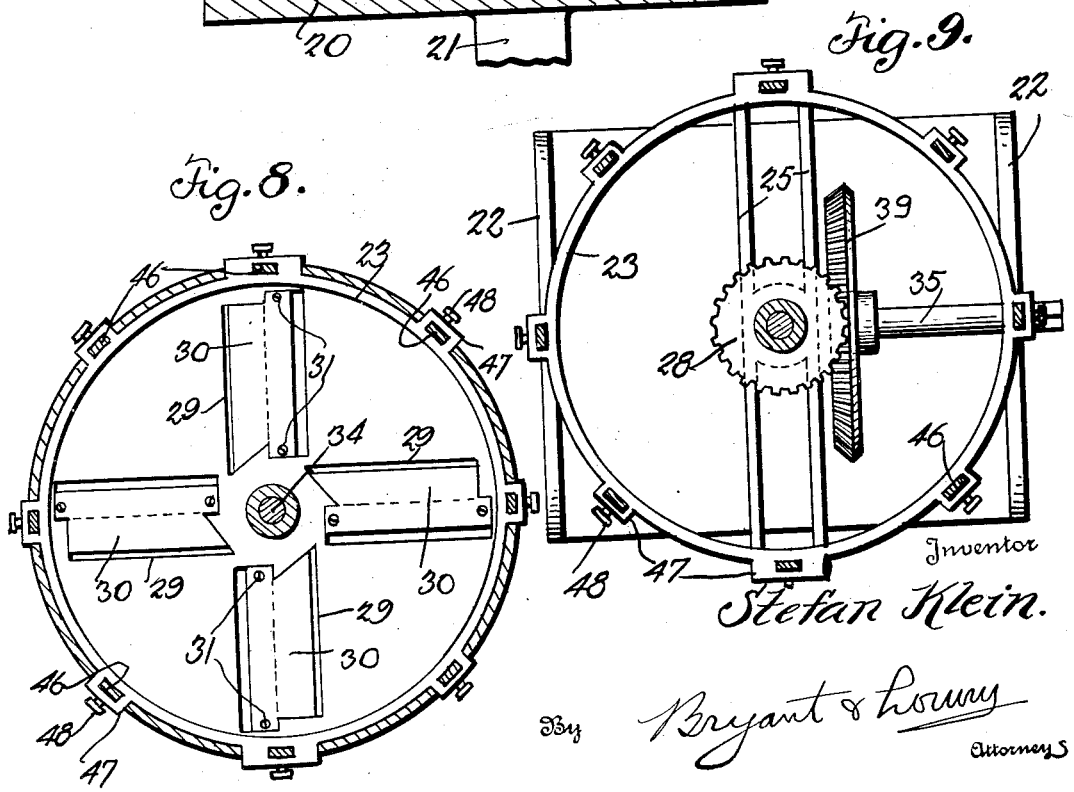
Inventor
Stefan Klein.
By Bryant & Lowry
Attorneys Patented June 26, 1934

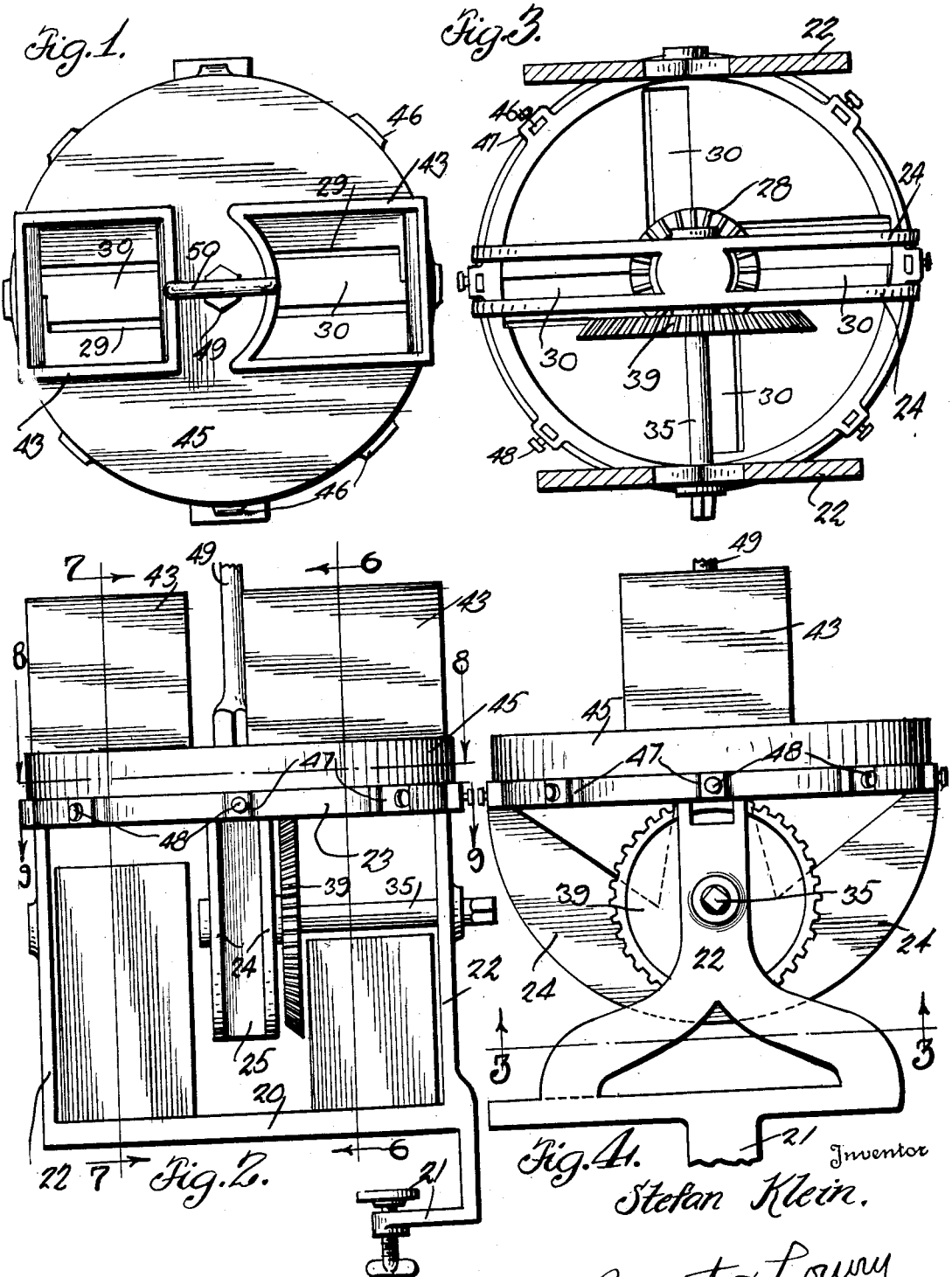

1,964,437

UNITED STATES PATENT OFFICE 1,964,437

VEGETABLE CUTTER AND GRATER

Stefan Klein, Montreal, Quebec, Canada

Application September 15, 1932, Serial No. 633,353

3 Claims. (Cl. 146—124)

This invention relates to certain new and useful improvements in vegetable cutters and graters.

The primary object of the invention is to provide a vegetable cutter and grater wherein a manually rotatable ring member carrying radial cutting or slicing blades has a pair of hoppers for the reception of vegetables disposed thereover with receptacles located beneath each hopper for the collection of the cut or sliced vegetables.

A further object of the invention is to provide a device of the foregoing character embodying interchangeable parts permitting either the cutting or grating of vegetables and the like.

It is a further object of the invention to provide a novel support for a manually operated shaft for imparting movement to cutting blades or a grating cylinder wherein the shaft provides the support for driving gears for a cutter and also a support for the direct mounting thereon of a grating cylinder.

With the above and other objects in view that will become apparent as the nature of the invention is better understood, the same consists in the novel form, combination and arrangement of parts hereinafter more fully described, shown in the accompanying drawings and claimed.

In the drawings:—

Figure 1 is a top plan view of the device set up as a vegetable cutter;

Figure 2 is a side elevational view showing the table clamp and driving gear for the cutter member;

Figure 3 is a horizontal sectional view taken on line 3—3 of Figure 4 showing the driving gears for the cutter and the radially disposed cutting blade;

Figure 4 is an end elevational view of the device;

Figure 5 is a vertical longitudinal sectional view showing the double vegetable hopper secured to the upper end of the frame and the driving gears for the cutting wheels;

Figure 6 is a vertical cross-sectional view taken on line 6—6 of Figure 2;

Figure 7 is a vertical cross-sectional view taken on line 7—7 of Figure 2;

Figure 8 is a horizontal sectional view taken on line 8—8 of Figure 2, showing the clamping devices for retaining the vegetable hopper in position;

Figure 9 is a horizontal sectional view taken on line 9—9 of Figure 2;

Figure 10 is a perspective view of one of the cutter blades for the shaving of the vegetables;

Figure 11 is a top plan view of another form of cutting blade for producing V-shaped shreds; and Figure 12 is an edge elevational view of another form of cutting blade for producing shreds of rectangular cross section.

Referring more in detail to the accompanying drawings, and particularly to Figures 1 to 9, there is illustrated a vegetable cutter comprising a framework having a base plate 20 carrying a table clamp 21 and having a pair of end standards 22 rising therefrom. A ring member 23 is mounted upon the upper ends of the standards 22 and arcuate frame bars 24 projecting from a central block member 25 support the ring member 23 at points intermediate the standards 22.

As shown in Figure 5, a disk member 26 is rotatably supported upon the ring member 23 and has a central hub portion 27 carrying a depending bevel pinion 28 forming a part of the rotating means for the disk member 26. The disk member 26 is provided with a series of radial openings 29 in which cutting blades 30 are mounted and secured as at 31 to an edge wall of the openings in the disk member as shown in Figure 8.

The cutting blade 30 is shown in detail in Figure 10 and includes a knife edge 32 and a rolled cutter 33 upon one end thereof. The cutting blade shown in Figure 11 has the cutting edge 32a thereof serrated and of V-form for producing vegetable shreds of similar configuration. In the form of cutting blade shown in Figure 12, the cutting edge 32b is of corrugated rectangular formation for producing shredded vegetables that are rectangular in cross-section.

As shown more clearly in Figure 5, the block member 25 of the cross support for the ring member 23 carries a perpendicular vat 34 having a bearing for the hub portion 27 of the disk member 26. The operating means for the disk member carrying the cutters 30 includes a shaft 35 journalled at one end in a bearing 36 in either standard 22 with the inner end thereof having a bearing 37 in the block 25, the shaft 35 adjacent the block 25 having a keyed portion 38 engaged with the bevel gear 39 that meshes with the bevel pinion 28. The crank handle 40 upon the outer end of the shaft 35 is operated for rotating the shaft and the meshing gear and pinion for the rotation of the disk member 26 carrying the cutting blades.

The disk member 26 is retained in position upon the ring member 23 by means of a gasket disk 41 and a hopper construction comprising a bottom plate 42 having diametrically opposite hoppers 43 rising therefrom above openings 44 in the gasket member 41 that overlie the openings 29 in the disk member 26 and cutting blades 30. An annular flange 45 depending from the plate 42 of the hopper construction carries depending fingers 46 extending through straps 47 projecting outwardly of the ring member 23 and engaged by set screws 48 for retaining the hopper construction in position as well as the gasket member 41 and disk member 26. The stud 34 rising from the block 25 projects through the gasket member 41 and plate 42 of the hopper construction and is threaded at its upper end to receive the screw handle 49 that acts further to retain the hopper construction in position while said handle as shown in Figure 11 is provided with a hand grip 50 that may be utilized for transporting the device from one position to another. A collection receptacle 51 is supported on the base plate 20 of the frame structure beneath each pair of associated openings 29 and 44.

Vegetables to be cut, sliced or shredded are placed in the hopper 43 and forced downwardly through the openings 44 for contact with the cutting blades 30, the disk member 26 carrying the cutting blades being rotated by the manually operated shaft 35 that has a gear and pinion connection with the disk member. The shaved or cut vegetables drop into the receptacle 51 which may be removed from either side of the device, one of the receptacles being shorter than the other one to provide clearance for the shaft 35.

From the above detailed description of the invention, it is believed that the construction and operation thereof will at once be apparent and while there are herein shown and described the preferred embodiments of the invention, it is nevertheless to be understood that minor changes may be made therein without departing from the spirit and scope of the invention as claimed.

I claim:—

1. In a vegetable cutter and grater, a frame structure comprising a horizontal ring member, a cutter blade carrying disk member rotatably supported on the ring member and carrying a depending pinion and a manually operated gear on the frame structure engaged with the pinion for rotating the disk member, a hopper construction above the disk member, means for securing the hopper to the frame, a perpendicular stud on the frame structure for the rotatable support of the disk member and pinion and projecting above the base of the hopper, and a handle engaged with the stud above the hopper base.

2. In a vegetable cutter and grater, a frame structure comprising a horizontal ring member, a cutter blade carrying disk member rotatably supported on the ring member and carrying a depending pinion, a manually operated gear on the frame structure engaged with the pinion for rotating the disk member, a hopper construction above the disk member, means for securing the hopper to the frame, a perpendicular stud on the frame structure for the rotatable support of the disk member and pinion and projecting above the base of the hopper, a handle engaged with the stud above the hopper base, the frame structure further including a base plate, end standards rising therefrom, and an intermediate frame between the standards and engaged with the ring member cooperating with a standard for the support of the operating means for the disk member.

3. In a vegetable cutter and grater, a frame structure comprising a horizontal ring member, a cutter blade carrying disk members rotatable on the ring member, a pinion integral with the disk member and depending therefrom, a manually operable gear beneath the disk member engaged with the pinion, a hopper construction clampingly mounted on the frame structure for retaining the disk member in position, an operating shaft for the gear journalled in the frame structure and a center bearing stud for the disk member and pinion projecting upwardly from the frame structure, and a lifting handle having threaded engagement with the upper end of the stud.

STEFAN KLEIN.